J. FAIRCLOUGH.

Balancing Millstones.

No. 786. Reissued Aug. 2, 1859.

WITNESSES
J. H. Myers.
R. A. Collins

INVENTOR
John Fairclough.

N. PETERS, Photo-Lithographer, Washington, D. C.

UNITED STATES PATENT OFFICE.

JOHN FAIRCLOUGH, OF LOUISVILLE, KENTUCKY.

IMPROVEMENT IN BALANCING MILL-STONES.

Specification forming part of Letters Patent No. 22,356, dated December 21, 1858; Reissue No. 786, dated August 2, 1859.

*To all whom it may concern:*

Be it known that I, JOHN FAIRCLOUGH, of Louisville, in the county of Jefferson and State of Kentucky, have invented a new and useful Improvement in Balancing Mill-Stones; and I do hereby declare that the following is a full, clear, and exact description of the same, reference being had to the annexed drawings, making a part of this specification, in which—

Figure 1:
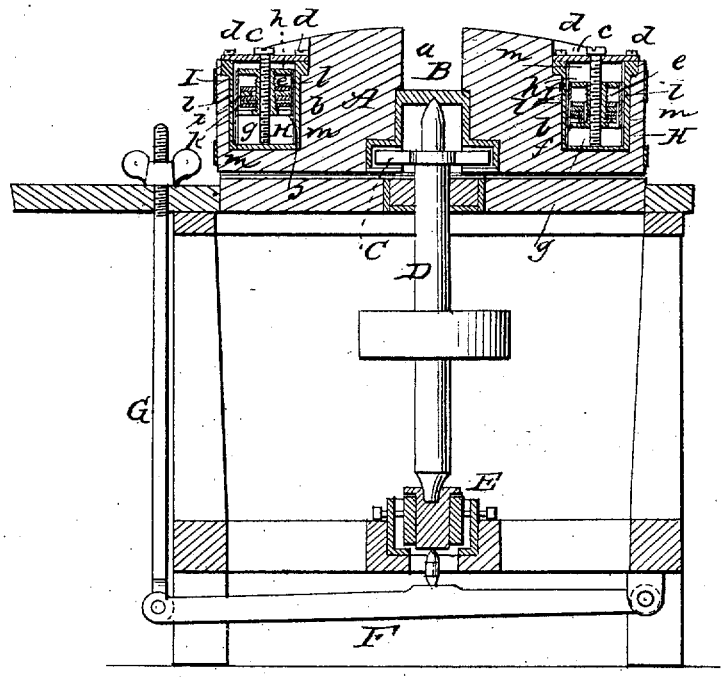
Figure 2:
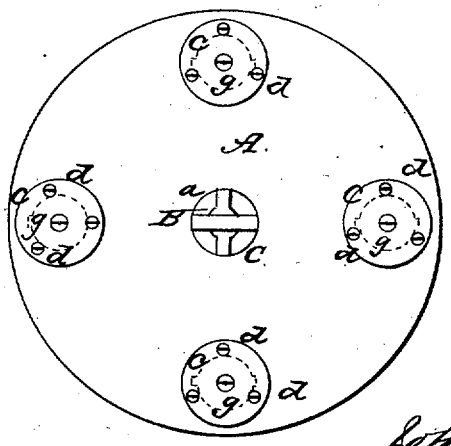

Figure 1 is a vertical central section of an upper mill stone or runner with my invention applied to it, and also bisected. Fig. 2 is a plan or top view of the same.

Similar letters of reference indicate corresponding parts in the two figures.

This invention consists in the employment or use of adjustable weights fitted in the upper stone or "runner" in such a manner as to admit of the perfect balancing of the stone both as regard its gravity or weight and the centrifugal force generated by its rotation.

To enable those skilled in the art to fully understand and construct my invention, I will proceed to describe it.

A represents an upper mill stone or runner of usual construction. B is the bail, which is fitted in the eye *a;* and C is the driver, placed on a spindle, D, and having its ends fitted in recesses in the driver. The lower end of the spindle is stepped in a box, E, which rests on a bridge-tree, F, that is regulated or adjusted by a screw-rod, G, as plainly shown in Fig. 1.

The above parts are of usual construction, and therefore do not require a minute description.

In the upper surface of the stone A recesses *b* are made to receive cylindrical metal boxes H. These boxes are fitted in the stone near its periphery, and four may be used at equal distances apart. I do not, however, confine myself to any particular number, although perhaps four would be preferable. The boxes are each provided with a cover or cap, *c*, the caps being secured to the boxes by screws *d*. The boxes H extend down to the lower part of the stone, and each has a metal cylinder, I, fitted within it. The cylinders I are considerably shorter than the boxes H, in order to allow the former a requisite degree of adjustability within the latter, (See Fig, 1.) The cylinders I have each a vertical tube, *e*, fitted centrally within them, the lower ends of the tubes being attached to traverse or cross bars F, at the bottoms of the cylinders. The tubes *e* have screw-threads formed on them, both inside and out, and a screw, *g*, passes through each tube, said screws also passing centrally through the caps *c*, the lower ends being stepped in the bottoms of the boxes H. In the upper part of each cylinder I a circular plate, *h*, is fitted. These plates are screwed on the tubes *e*, and in each cylinder a series of weights, *i*, are placed. The bottoms *j* of the cylinders rests on nuts *k*, which are fitted on the tubes *e*. The cylinders I are provided with two projections, *l*, at opposite points of their peripheries, and these projections fit in slots or grooves *m* in the boxes H, and serve as guides to the same, and prevent their turning with the screws *g*.

From the above description it will be seen that the stone A may, so far as its gravity is concerned, be readily balanced on the spindle D by the weights *i*, more or less being placed in each cylinder, so as to effect the result; but by doing this it will be observed that when the stone is rotated centrifugal force will be generated, and this adjustment of the weights in order to balance the stone on the spindle may cause a lateral pressure and an undue degree of friction on the collar of the spindle D. For instance, if one cylinder, I, has half its weights removed and the opposite cylinder is full, in order to balance the stone, it will be seen that when the stone is rotated the side of the stone which has the greater number of weights *i* will, owing to centrifugal force, have a greater tendency to fly off in a tangent than the opposite side, it being understood that the center of gravity of the weights is supposed to be in the same horizontal plane. In order, therefore, to remedy this difficulty, the cylinders I are rendered adjustable and raised and lowered within the boxes H by turning the screw *g*, and the center of gravity of the weights may be adjusted relatively with the point of the spindle D, so as to neutralize this unequal centrifugal force. If but few weights are in a cylinder, the cylinder requires to be elevated, so as to increase the distance between the point of the spindle and the center of gravity of the weights. If many weights are in a cylinder, their center of gravity is brought in line or in the same horizontal plane with the point of the spindle. In case but few weights *i* are employed in a cylinder, these few must necessarily be adjusted in the upper part of the cylinder and box H. The cylinder in this case may be removed, the nuts secured in proper position by the nut *k* on the tube E, and the cylinder be inserted in its box H, so as to bring the weights to the upper part of the stone A. The weights may always be retained in proper place by the plates *h*, so that when the stone is inverted for the purpose of being picked, or for other purposes, the weights will be retained in proper place.

I do not confine myself to the means herein shown and described for adjusting the weights in the stone, for various plans might be devised for the purpose.

I am aware that fixed weights have been inserted in the backs of the mill-stones for the purpose of balancing them in a state of rest; but I am not aware that adjustable weights have been employed and arranged so as to balance the stone both as regard its gravity or weight and the centrifugal force generated by its rotation.

I claim, therefore, as new and desire to secure by Letters Patent—

The employment or use of weights *i*, placed within boxes or recesses in the back of the stone and arranged, substantially as described, so that they may be adjusted vertically, and more or less be used in each box or recess to admit of the balancing of the stone or runner both while in motion and at rest.

JOHN FAIRCLOUGH.

Witnesses:
N. W. WALLER,
JOS. KENNEDY.